(12) United States Patent
Ito et al.

(10) Patent No.: US 10,597,011 B2
(45) Date of Patent: Mar. 24, 2020

(54) DEFLECTION CONTROL APPARATUS

(71) Applicant: TOYOTA JIDOSHA KABUSHIKI KAISHA, Toyota-shi, Aichi-ken (JP)

(72) Inventors: Hironori Ito, Susono (JP); Akira Nagae, Susono (JP); Ryo Inomata, Ashigarakami-gun (JP); Masayuki Ikeda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/864,588

(22) Filed: Jan. 8, 2018

(65) Prior Publication Data

US 2018/0229700 A1   Aug. 16, 2018

(30) Foreign Application Priority Data

Feb. 10, 2017   (JP) .................................. 2017-023333

(51) Int. Cl.
| | | |
|---|---|---|
| *B60T 8/24* | (2006.01) | |
| *B60T 8/1755* | (2006.01) | |
| *B60T 8/172* | (2006.01) | |
| *B60T 8/58* | (2006.01) | |

(52) U.S. Cl.
CPC .............. *B60T 8/246* (2013.01); *B60T 8/172* (2013.01); *B60T 8/17557* (2013.01); *B60T 8/58* (2013.01); *B60T 2201/083* (2013.01); *B60T 2201/16* (2013.01); *B60T 2210/24* (2013.01); *B60T 2250/03* (2013.01); *B60T 2250/04* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 2003/0120414 | A1* | 6/2003 | Matsumoto ........ | B60K 31/0008 701/96 |
| 2005/0096826 | A1* | 5/2005 | Iwasaka .............. | B60T 8/17557 701/70 |
| 2011/0022285 | A1* | 1/2011 | Yonezawa ........... | B60T 8/17557 701/70 |
| 2011/0246040 | A1* | 10/2011 | Nakayama .......... | B60T 8/17557 701/70 |

(Continued)

FOREIGN PATENT DOCUMENTS

| | | |
|---|---|---|
| EP | 1849669 A1 | 10/2007 |
| EP | 2248710 A1 | 11/2010 |

(Continued)

*Primary Examiner* — Tyler D Paige
(74) *Attorney, Agent, or Firm* — Sughrue Mion, PLLC

(57) ABSTRACT

A deflection control apparatus is configured to perform a deflection control in which a subject vehicle is deflected by a braking force difference between left and right wheels. The vehicle control apparatus is provided with: a calculator configured, in the deflection control, (i) to calculate a target yaw rate so that the subject vehicle drives on a target track by the deflection control, and (ii) to calculate a target yaw moment by dividing the calculated target yaw rate by a coefficient based on a velocity of the subject vehicle; and a controller configured to control a braking force of each wheel so that the target yaw moment is applied to the subject vehicle.

7 Claims, 9 Drawing Sheets

(56) References Cited

U.S. PATENT DOCUMENTS

| | | | | |
|---|---|---|---|---|
| 2012/0130595 A1* | 5/2012 | Hayakawa | ............ | B60W 30/12 |
| | | | | 701/42 |
| 2013/0253793 A1* | 9/2013 | Lee | ................... | B60W 50/029 |
| | | | | 701/70 |
| 2018/0105152 A1* | 4/2018 | Nagae | ................ | B60T 8/17557 |
| 2018/0229700 A1* | 8/2018 | Ito | .......................... | B60T 8/172 |
| 2018/0312155 A1* | 11/2018 | Ito | ............................. | B60T 7/22 |

FOREIGN PATENT DOCUMENTS

| | | |
|---|---|---|
| JP | 2001310719 A | 11/2001 |
| JP | 2006-282168 A | 10/2006 |
| JP | 2010-52717 A | 3/2010 |
| WO | 2009115884 A1 | 9/2009 |

\* cited by examiner

DEFLECTION CONTROL APPARATUS

CROSS-REFERENCE TO RELATED APPLICATIONS

This application is based upon and claims the benefit of priority of the prior Japanese Patent Application No. 2017-023333, filed on Feb. 10, 2017, the entire contents of which are incorporated herein by reference.

BACKGROUND OF THE INVENTION

1. Field of the Invention

Embodiments of the present invention relate to a deflection control apparatus configured to deflect a vehicle, and particularly relate to a deflection control apparatus configured to deflect a vehicle by using a braking force difference between left and right wheels.

2. Description of the Related Art

For this type of apparatus, for example, there has been proposed an apparatus configured to generate a yaw moment in a direction of avoiding lane departure by using a braking force difference between left and right wheels when there is a possibility that a subject vehicle or a host vehicle departs or deviates from a driving lane (refer to Japanese Patent Application Laid Open No. 2006-282168 (Patent Literature 1)).

According to a technology/technique described in the Patent Literature 1, the subject vehicle can be moved to a central side of the driving lane. The technology/technique described in the Patent Literature 1, however, it is not considered to make the subject vehicle drive along a desired track.

It is ideally desirable to set a target trajectory for defining the behavior of the subject vehicle (e.g. a lateral position trajectory, a yaw rate trajectory, a lateral velocity trajectory, etc.) before starting a control of avoiding the departure of the subject vehicle from the driving lane, and to perform a state feedback control, which uses an equation of motion of the vehicle, in order to achieve the target trajectory (so that the subject vehicle ends up driving along a certain track). However, generation of the braking force difference between left and right wheel causes deceleration of the vehicle, and it is thus desirable that a control time is as short as possible. It is therefore hard to apply the state feedback control when there is the braking force difference between left and right wheel.

SUMMARY

In view of the aforementioned problem, it is therefore an object of embodiments of the present invention to provide a deflection control apparatus that allows a vehicle to drive along a target track while deflecting the vehicle by using a braking force difference between left and right wheels.

The above object of embodiments of the present invention can be achieved by a deflection control apparatus configured to perform a deflection control in which a subject vehicle is deflected by a braking force difference between left and right wheels, said vehicle control apparatus is provided with: a calculator configured, in the deflection control, (i) to calculate a target yaw rate so that the subject vehicle drives on a target track by the deflection control, and (ii) to calculate a target yaw moment by dividing the calculated target yaw rate by a coefficient based on a velocity of the subject vehicle; and a controller configured to control a braking force of each wheel so that the target yaw moment is applied to the subject vehicle.

According to studies of the present inventors, it has been found that a yaw moment, which can be obtained from a yaw rate by using an equation of motion of the vehicle, can be approximated by dividing the yaw rate by the coefficient based on the velocity (refer to embodiments described later, for the details).

The deflection control apparatus is based on the aforementioned fact. In the deflection control apparatus, the target yaw moment is calculated from the target yaw rate without using the equation of motion of the vehicle. Thus, in the deflection control apparatus, if the target yaw rate (i.e. the yaw rate for making the subject vehicle drive along the target track) is determined, the target yaw moment can be determined in advance (e.g. before the deflection of the subject vehicle is started by the deflection control). The deflection control apparatus is different from the aforementioned state feedback control (i.e. a technique/technology in which the state feedback control is performed during the deflection of the subject vehicle by the deflection control), in that the target yaw moment can be determined in advance.

The target yaw rate may be obtained on the basis of physical quantities for defining the target track, such as, for example, an amount of movement in a lateral direction of the subject vehicle (i.e. in a left-right direction of the subject vehicle), an angle made by an extending direction of a driving lane and a longitudinal direction of the subject vehicle, and the velocity of the subject vehicle (refer to embodiments described later, for the details).

Therefore, according to the deflection control apparatus, it is possible to make the subject vehicle drive along the target track while applying the target yaw moment to the subject vehicle by using the braking force of each wheel (i.e. while deflecting the subject vehicle by using the braking force difference between the left and right wheels).

In one aspect of the deflection control apparatus according to embodiments of the present invention, the calculator is configured to calculate the target yaw moment by correcting a provisional value of the target yaw moment, which is obtained by dividing the calculated target yaw rate by the coefficient, on the basis of a response time until a yaw rate corresponding to the target yaw moment is actually generated in the subject vehicle in the deflection control.

In another aspect of the deflection control apparatus according to embodiments of the present invention, the calculator is configured to repeat calculation of the target yaw moment during implementation of the deflection control, and to calculate the target yaw moment while successively updating the coefficient on the basis of a current velocity of the subject vehicle. According to this aspect, it is possible to perform the deflection control corresponding to the velocity of the subject vehicle, which varies due to the deceleration caused by the deflection control, in a period of implementation of the deflection control.

In another aspect of the deflection control apparatus according to embodiments of the present invention, the target track is a track on which departure can be avoided if there is a possibility that the subject vehicle departs from a driving lane on which the subject vehicle is currently traveling. According to this aspect, it is possible to avoid the departure of the subject vehicle from the driving lane.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A deflection control apparatus according to embodiments of the present invention will be explained with reference to the drawings. In the following embodiments, a vehicle equipped with the deflection control apparatus according to embodiments of the present invention is used for explanation.

<First Embodiment>

A deflection control apparatus in a first embodiment of the present invention will be explained with reference to FIG. 1 to FIG. 5A and FIG. 5B.

(Configuration of Vehicle)

Figure 1:
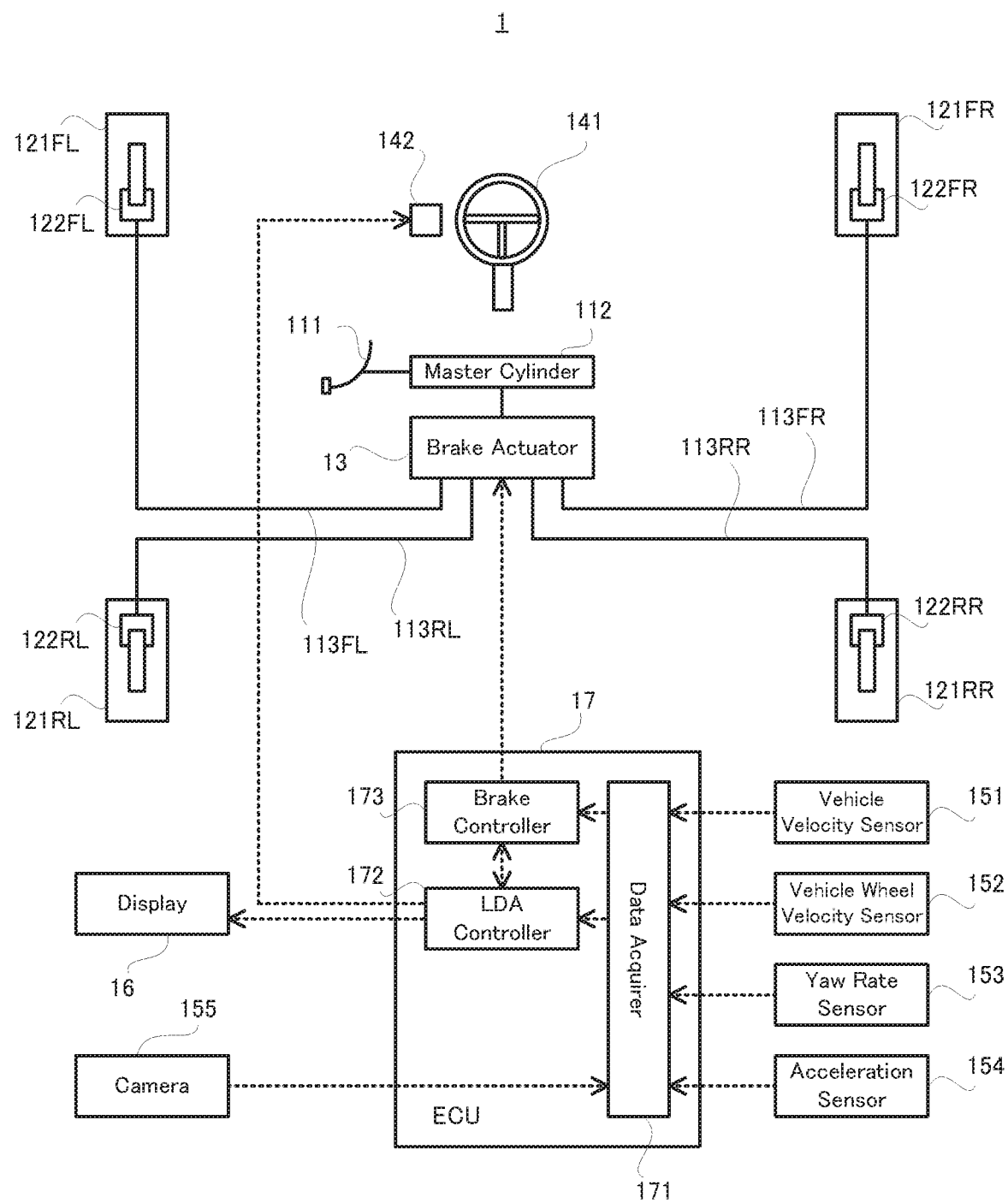
FIG. 1 is a block diagram illustrating a configuration of a vehicle according to a first embodiment.

A configuration of a vehicle 1 equipped with the deflection control apparatus according to the first embodiment will be explained with reference to FIG. 1. FIG. 1 is a block diagram illustrating the configuration of the vehicle 1 according to the first embodiment.

In FIG. 1, the vehicle 1 is provided with a brake pedal 111, a master cylinder 112, a brake actuator 13, a wheel cylinder 122FL provided on a front left wheel 121FL, a wheel cylinder 122RL provided on a rear left wheel 121RL, a wheel cylinder 122FR provided on a front right wheel 121FR, a wheel cylinder 122RR provided on a rear right wheel 121RR, and brake pipes 113FL, 113RL, 113FR, and 113RR.

The vehicle 1 is further provided with a steering wheel 141, a vibration actuator 142, a vehicle velocity sensor 151, a vehicle wheel velocity sensor 152, a yaw rate sensor 153, an acceleration sensor 154, a camera 155, a display 16, and an electronic control unit (ECU) 17, which is one specific example of the "deflection control apparatus" according to embodiments of the present invention.

The master cylinder 112 is configured to adjust a pressure of brake fluid (or any fluid) in the master cylinder 112 in accordance with a step amount of the brake pedal 111. The pressure of the brake fluid in the master cylinder 112 is transmitted to the wheel cylinders 122FL, 122RL, 122FR, and 122RR via the brake pipes 113FL, 113RL, 113FR, and 113RR, respectively. As a result, braking forces corresponding to pressures of the brake fluid transmitted to the wheel cylinders 122FL, 122RL, 122FR, and 122RR are applied to the front left wheel 121FL, the rear left wheel 121RL, the front right wheel 121FR, and the rear right wheel 121RR, respectively.

The brake actuator 13 is configured to adjust the pressure of the brake fluid transmitted to each of the wheel cylinders 122FL, 122RL, 122FR, and 122RR, independently of the step amount of the brake pedal 111, under control of the ECU 17. Therefore, the brake actuator 13 is configured to adjust the braking force applied to each of the front left wheel 121FL, the rear left wheel 121RL, the front right wheel 121FR, and the rear right wheel 121RR, independently of the step amount of the brake pedal 111.

The steering wheel 141 is an operator operated by a driver to steer the vehicle 1 (i.e. to turn wheels to be steered or turned). The vibration actuator 142 is configured to vibrate the steering wheel 141, under the control of the ECU 17.

The ECU 17 is configured to control entire operation of the vehicle 1. Particularly in the embodiment, the ECU 17 is configured to perform a lane departure suppressing operation for suppressing departure or deviation of the vehicle 1 from a driving lane on which the vehicle 1 is currently traveling. In other words, the ECU 17 functions as a control apparatus for realizing so-called LDA (Lane Departure Alert) or LDP (Lane Departure Prevention).

In order to perform the lane departure suppressing operation, the ECU 17 is provided with a data acquirer 171, a LDA controller 172, and a brake controller 173, as processing blocks logically realized, or processing circuits physically realized inside the ECU 17.

(Lane Departure Suppressing Operation).

Next, the lane departure suppressing operation according to the embodiment will be explained with reference to a flowchart in FIG. 2.

Figure 2:
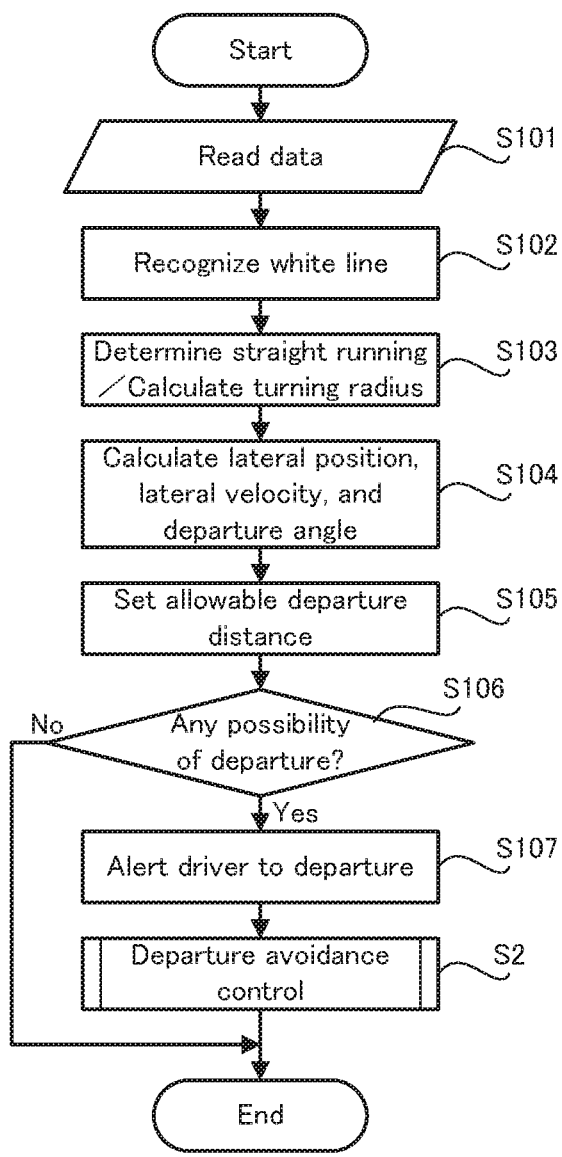
FIG. 2 is a flowchart illustrating a lane departure suppressing operation according to the first embodiment.

In FIG. 2, firstly, the data acquirer 171 obtains detection data indicating respective detection results of the vehicle velocity sensor 151, the vehicle wheel velocity sensor 152, the yaw rate sensor 153, and the acceleration sensor 154, and image data indicating images taken by the camera 155 (step S101).

The LDA controller 172 analyzes the image data obtained in the step S101, thereby specifying a lane edge of the driving lane on which the vehicle 1 is currently traveling (or a "white line" exemplified in the embodiment as one example of the lane edge) in the images taken by the camera 155 (step S102). A detailed explanation of a method of recognizing the white line will be omitted because the existing technique/technology can be applied to the method.

The LDA controller 172 determines whether or not the driving lane on which the vehicle 1 is currently traveling is a straight lane or a curve, on the basis of the white line specified in the step S102, and calculates a curvature radius of the driving lane if the driving lane is determined to be the curve (step S103). The curvature radius of the driving lane is substantially equivalent to a curvature radius of the white line. Thus, the LDA controller 172 may calculate the curvature radius of the white line specified in the step S102 and may treat the calculated curvature radius as the curvature radius of the driving lane.

The LDA controller 172 further calculates a current lateral position, a current lateral velocity, and a current departure angle of the vehicle 1, on the basis of the white line specified in the step S102 (step S104). Here, the "lateral position" means a distance from the center of the driving lane to the vehicle 1 (or typically, a distance to the center of the vehicle 1) in a lane width direction, which is orthogonal to a direction in which the driving lane extends (or a lane extension direction). The "lateral velocity" means a velocity of the vehicle 1 in the lane width direction. The "departure angle" means an angle made by the driving lane and a longitudinal direction axis of the vehicle 1 (i.e. an angle made by the white line and the longitudinal direction axis of the vehicle 1).

The LDA controller 172 further sets an allowable departure distance (step S105). The allowable departure distance indicates an allowable maximum value of a departure distance of the vehicle 1 from the driving lane (i.e. a departure distance of the vehicle 1 from the white line) when the vehicle 1 departs from the driving lane.

For example, the allowable departure distance may be set in the following manner; namely, the LDA controller 172 may set the allowable departure distance from the viewpoint of satisfying requirements of law and regulations (e.g. requirements of new car assessment programme (NCAP)). A method of setting the allowable departure distance is not limited to this example.

Then, the LDA controller 172 determines whether or not there is a possibility that the vehicle 1 departs from the driving lane on which the vehicle 1 is currently traveling (step S106). Specifically, for example, the LDA controller 172 may calculate a future position (e.g. in several to several ten seconds) of the vehicle 1, on the basis of a current velocity, the current lateral position, the current lateral velocity, or the like of the vehicle 1. Then, the LDA controller 172 may determine whether or not the vehicle 1 goes across or is on the white line in the future position. If it is determined that the vehicle 1 goes across or is on the white line in the future position, the LDA controller 172 may determine that there is the possibility that the vehicle 1 departs from the driving lane.

In the determination in the step S106, if it is determined that there is no possibility that the vehicle 1 departs from the driving lane (the step S106: No), the lane departure suppressing operation illustrated in FIG. 2 is ended. Then, the LDA controller 172 restarts the lane departure suppressing operation illustrated in FIG. 2 after a lapse of a first predetermined period (e.g. several milliseconds to several ten milliseconds). In other words, the lane departure suppressing operation illustrated in FIG. 2 is repeated with a period corresponding to the first predetermined period.

On the other hand, in the determination in the step S106, if it is determined that there is the possibility that the vehicle 1 departs from the driving lane (the step S106: Yes), the LDA controller 172 alerts the driver of the vehicle 1 to the possibility of the departure of the vehicle 1 from the driving lane (step S107). Specifically, the LDA controller 172 may control the display 16, for example, to display an image indicating the possibility of the departure of the vehicle 1 from the driving lane, and/or may control the vibration actuator 142 to inform the driver of the possibility of the departure of the vehicle 1 from the driving lane by using the vibration of the steering wheel 141.

In parallel with the step S107, the LDS controller 172 performs a departure avoidance control (step S2). Here, the departure avoidance control is a control in which a yaw moment in a direction of avoiding the departure is applied to the vehicle 1 so that the departure distance of the vehicle 1 from the driving lane is within the allowable departure distance.

In the departure avoidance control according to the embodiment, a braking force is applied to at least one of the front left wheel 121FL, the rear left wheel 121RL, the front right wheel 121FR, and the rear right wheel 121RR so that there is a braking force difference between the left and right wheels. As a result, the yaw moment in the direction of avoiding the departure is applied to the vehicle 1. Hereinafter, the departure avoidance control will be specifically explained with reference to flowcharts in FIG. 3 and FIG. 4.

Departure Avoidance Control (LDA Controller)

Figure 3:
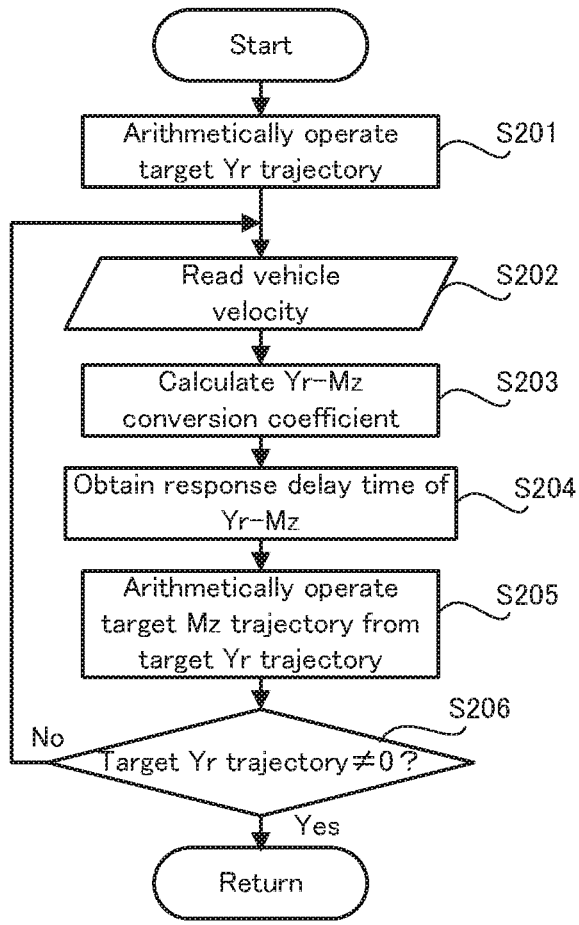
FIG. 3 is a flowchart illustrating a departure avoidance control performed by an LDA controller according to the first embodiment.

In FIG. 3, firstly, the LDA controller 172 arithmetically operates a target yaw rate (Yr) trajectory so that the vehicle 1, which is leaving from the center of the driving lane, travels along a target track that is directed to the center of the driving lane (i.e. a traveling path to be targeted) (step S201). The target yaw rate trajectory indicates a change with time (or a time transition) in a target value of a yaw rate generated in the vehicle 1 when the vehicle 1 travels along the target track (refer to FIG. 5A described later).

Specifically, the LDA controller 172 may use the following calculation conditions as a premise, and may arithmetically operate the target yaw rate trajectory, on the basis of the velocity of the vehicle 1, and the lateral position and the departure angle calculated in the step S104. The calculation conditions may be (i) that the target yaw rate trajectory is a trapezoidal wave, (ii) that the trapezoidal wave has a constant rise time (e.g. 0.5 seconds), (iii) that the vehicle 1 has a maximum departure amount (i.e. a maximum distance traveled in a lane width direction) when the vehicle 1 has a yaw angle of 0 degrees, and (iv) that the lateral position when the departure amount is the maximum is within the allowable departure distance.

Figure 5A:
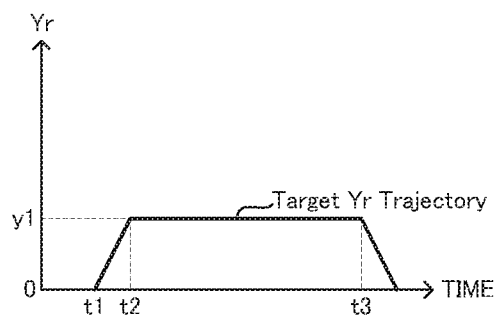
FIG. 5A and FIG. 5B are diagrams illustrating one example of a target yaw rate trajectory and a target yaw moment trajectory.

FIG. 5A illustrates one example of the target yaw rate trajectory arithmetically operated in the step S201. In FIG. 5A, a period between a time point t1 and a time point t2 corresponds to the rise time of the trapezoidal wave. A time point t3 is a time point at which the vehicle 1 has a yaw angle of 0 degrees, i.e. a time point at which the vehicle 1 has the maximum departure amount. A yaw rate r1 varies depending on the departure angle (or the lateral velocity) and the maximum departure amount that is within the allowable departure distance.

As described above, at the time point t3, the vehicle 1 has a yaw angle of 0 degrees (i.e. the angle between the white line indicating the driving lane and the longitudinal direction axis of the vehicle 1 is 0 degrees). After the time point t3, a target yaw rate decreases, but a yaw angle of the vehicle 1 increases towards the center of the driving lane due to the target yaw rate. Thus, if the vehicle 1 is controlled to achieve the target yaw rate trajectory, the vehicle 1 travels from the center of the driving lane to the lane edge, and then travels along a curve track that is directed to the center from the lane edge.

After the step S201, the LDA controller 172 obtains the velocity of the vehicle 1, for example, from the detection result of the vehicle velocity sensor 151 (step S202). The velocity of the vehicle 1 may be estimated, for example, from a current yaw moment. The LDA controller 172 then calculates a conversion coefficient for converting the yaw rate into the yaw moment, on the basis of the velocity of the vehicle 1 (step S203).

Now, the conversion coefficient will be explained (wherein differential calculus is expressed in the dotted-quad string format). An equation of motion of the vehicle (two-wheel model) is expressed by an equation (1). In the equation (1), "y", "θ", "Mz", "$I_z$", "m", "v", "$C_f$", "$C_r$", "$l_f$", and "$l_r$" are respectively the "lateral position", the "yaw angle", the "yaw moment", an "inertia yaw moment", "vehicle mass", the "velocity of the vehicle 1", a "front-wheel cornering power", a rear-wheel cornering power", a "distance between the center of gravity and a front-wheel axel", and a "distance between the center of gravity and a rear-wheel axel".

[Equation 1]

$$\dot{x} = \frac{d}{dt}\begin{bmatrix} y \\ \dot{y} \\ \theta \\ \dot{\theta} \end{bmatrix} = \begin{bmatrix} 0 & 1 & 0 & 0 \\ 0 & -\frac{C_f + C_r}{mv} & 0 & -\frac{C_f l_f - C_r l_r}{mv} - v \\ 0 & 0 & 0 & 1 \\ 0 & -\frac{C_f l_f - C_r l_r}{I_z v} & 0 & -\frac{C_f l_f^2 - C_r l_r^2}{I_z v} \end{bmatrix} \begin{bmatrix} y \\ \dot{y} \\ \theta \\ \dot{\theta} \end{bmatrix} + \begin{bmatrix} 0 \\ 0 \\ 0 \\ Mz \end{bmatrix} \quad (1)$$

The present inventors have found, from a result of simulations in which a fixed yaw moment (Mz) is inputted to the equation (1), that the yaw rate converges to a fixed value with respect to the fixed yaw moment. In other words, the present inventors have found that lateral acceleration and yaw angle acceleration can be set zero in the equation (1). When 0 is substituted in the lateral acceleration and the yaw angle acceleration in the equation (1), the yaw rate can be expressed as follows.

[Equation 2]

If $\dot{\theta}=0$ and $\ddot{y}=0$ are substituted (formulas on the way are omitted), $$\dot{\theta} = A_1 \cdot \frac{Mz}{\frac{C_f l_f^2 - C_r l_r^2}{v} \cdot A_1 + \frac{C_f l_f - C_r l_r}{v} - mv}$$

$$A_1 = \frac{C_f + C_r}{C_f l_f - C_r l_r}$$

$$A_2 = ((C_f l_f^2 + C_r l_r^2) \cdot A_1 + C_f l_f - C_r l_r)$$

This formula is arranged to obtain the following formula.

[Equation 3]

$$\dot{\theta} = A_1 \cdot \frac{Mz}{A_2/v - mv}$$

Generally, "A2/V>>mv", so the formula can be approximated as an equation (2)

$$\dot{\theta} \cong A_3 \cdot v \cdot Mz \quad \text{[Equation 4]}$$

$$A_3 = A_1/A_2 \quad (2)$$

From the equation (2), it is clear that the yaw moment can be obtained by dividing the yaw rate by a coefficient "$A_3 v$" including the vehicle velocity v. The coefficient "$A_3 v$" corresponds to the conversion coefficient calculated in the step S203. "$A_3$" is a constant defined by the cornering power and the distance between the center of gravity and the axle, as described above.

In parallel with the step S203, the LDA controller 172 obtains a response delay time until a yaw rate corresponding to a yaw moment to be applied (i.e. a target yaw moment) is actually generated in the vehicle 1 in the departure avoidance control (step S204). The response delay time may be a preset fixed value (or offset value), or may be a variable value corresponding to some physical quantity or parameter.

According to the studies of the present inventors, it has been found that there is a response delay, for example, due to a communication time between the ECU 17 and the brake actuator 13, a boosting time of the brake fluid, a time from when the yaw moment is applied to the vehicle to when the yaw rate corresponding to the applied yaw moment is generated, and the like.

The LDA controller 172 then arithmetically operates a target yaw moment trajectory from the target yaw rate trajectory by using the conversion coefficient, and corrects the target yaw moment trajectory on the basis of the response delay time (step S205). The target yaw moment trajectory indicates a change with time (or a time transition) in a target value of a yaw moment to be applied to the vehicle 1 when the vehicle 1 travels along the target track (refer to FIG. 5B described later).

The LDA controller 172 calculates a braking force that can achieve the corrected target yaw moment trajectory (step S205). At this time, the LDA controller 172 may individually calculate the respective braking forces applied to the front left wheel 121FL, the rear left wheel 121RL, the front right wheel 121FR, and the rear right wheel 121RR.

Figure 5B:
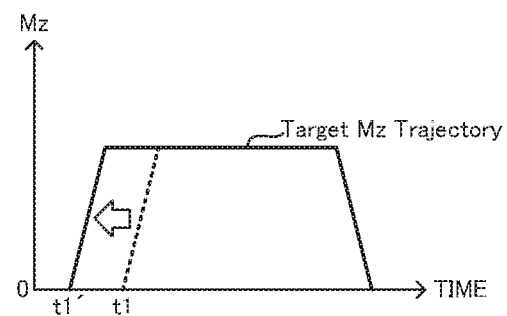

FIG. 5B illustrates one example of the target yaw moment (Mx) trajectory arithmetically operated in the step S205. A time point t1 in FIG. 5B corresponds to the time point t1 in FIG. 5A. A dashed line in FIG. 5B is a rising part of the target yaw moment trajectory obtained from the target yaw rate trajectory by using the conversion coefficient. Due to the correction based on the response delay time, the target yaw moment trajectory rises from a time point t1', which is before the time point t1, as illustrated in a solid line in FIG. 5B.

The LDA controller 172 may actually obtain the corrected target yaw moment trajectory for a short period Δt, and may calculate the braking force that allows the target yaw moment for the short period Δt to be applied to the vehicle 1. The LDA controller 172 then may transmit, to the brake controller 173, a signal indicating the calculated braking force. The LDA controller 172 then determines whether or not the target yaw rate trajectory for the short period Δt is not 0 (step S206).

In the determination in the step S206, if it is determined that the target yaw rate trajectory for the short period Δt is not 0 (the step S206: No), the LDA controller 172 repeats the process after the step S202. On the other hand, in the determination in the step S206, if it is determined that the target yaw rate trajectory for the short period Δt is 0 (the step S206: Yes), the LDA controller 172 ends the departure avoidance control illustrated in FIG. 3.

Departure Avoidance Control (Brake Controller)

The brake controller 173 calculates a pressure command value for designating the pressure of the brake fluid required to generate the braking force, on condition that the signal indicating the braking force is received from the LDA controller 172 (step S301). At this time, the brake controller 173 may individually calculate the respective pressure command values for designating the pressures of the brake fluid inside the wheel cylinders 122FL, 122RL, 122FR, and 122RR.

The brake controller 173 then controls the brake actuator 13 on the basis of the pressure command value (step S302). As a result, the braking force corresponding to the pressure command value is applied to at least one of the front left wheel 121FL, the rear left wheel 121RL, the front right wheel 121FR, and the rear right wheel 121RR. In other words, the yaw moment in the direction of avoiding the departure is applied to the vehicle 1 due to the braking force difference between the left and right wheels.

Figure 4:
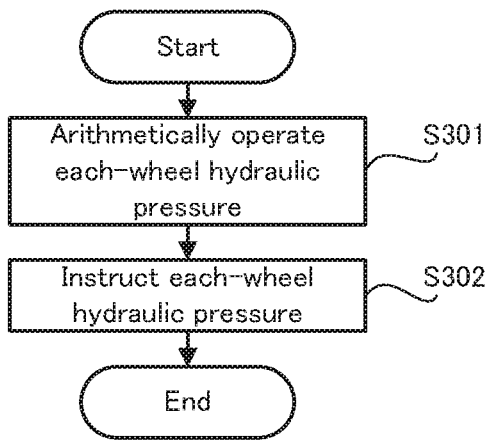
FIG. 4 is a flowchart illustrating a departure avoidance control performed by a brake controller according to the first embodiment.

When the departure avoidance control illustrated in FIG. 3 is performed, the brake controller 173 repeatedly receives a signal indicating the target yaw moment from the LDA controller 172, and thus, the departure avoidance control illustrated in FIG. 4 is also repeated.

(Technical Effect)

The departure avoidance control in which the yaw moment in the direction of avoiding the departure is applied to the vehicle 1 due to the braking force difference between the left and right wheels, requires a relatively short control time (e.g. several seconds). In the departure avoidance control, as described above, the target yaw moment trajectory is obtained from the target yaw rate trajectory in a relatively short time by using the conversion coefficient "$A_3v$" (i.e. by dividing the target yaw rate by the conversion coefficient "$A_3v$"), in other words, by solving an equation of motion of the vehicle. Here, the target yaw rate trajectory is arithmetically operated in order to make the vehicle 1 travel along the target track that is directed to the center of the driving lane. Therefore, if the vehicle 1 is controlled to achieve the target yaw moment trajectory, which is obtained from the target yaw rate trajectory, it is then possible to make the vehicle 1 travel along the target track.

In other words, according to the departure avoidance control, it is possible to make the vehicle 1 travel along the target track while suppressing a time in which the yaw rate in the direction of avoiding the departure is applied to the vehicle 1 due to the braking force difference between the left and right wheels.

The conversion coefficient "$A_3v$" includes the velocity v of the vehicle 1. Thus, if the velocity of the vehicle 1 is changed, the conversion coefficient "$A_3v$" is also changed. In the embodiment, however, the step S202 to the step S205 in FIG. 3 are repeated. In other words, in accordance with a change in the velocity of the vehicle 1 during implementation of the departure avoidance control, the conversion coefficient "$A_3v$" is successively updated. Thus, according to the departure avoidance control, it is possible to make the vehicle 1 drive while suppressing a shift between the target track and an actual track of the vehicle 1.

The "LDA controller 172" and the "brake controller 173" according to the embodiment are one example of the "calculator" and the "controller" according to embodiments of the present invention, respectively.

<First Modified Example>

In the aforementioned first embodiment, the conversion coefficient "$A_3v$" is successively updated by repeating the step S202 to the step S205 in FIG. 3; however, the first embodiment may be configured as follows. In other words, after the conversion coefficient "$A_3v$" is calculated on the basis of the velocity of the vehicle 1 at a start time point of the departure avoidance control, the same conversion coefficient "$A_3v$" may be used until the departure avoidance control is ended (or to put it differently, the conversion coefficient "$A_3v$" may not be successively updated during implementation of the departure avoidance control). In this case, for example, the shift between the target track and the actual track of the vehicle 1, which is caused by the change in the velocity of the vehicle 1, may be treated as control variation (or deviation).

<Second Modified Example>

In the aforementioned first embodiment, the response delay time is considered; however, the response delay time may not be considered. In this case, for example, the shift between the target track and the actual track of the vehicle 1, which is caused by the response delay time, may be treated as control variation (or deviation).

<Third Modified Example>

In the aforementioned first embodiment, the rising part of the target yaw moment trajectory is determined in the step S201 in FIG. 3; however, the first embodiment may be configured as follows. In other words, a falling part of the target yaw moment trajectory obtained in the step S201 may be determined in accordance with the behavior of the vehicle 1 during implementation of the departure avoidance control.

The departure avoidance control according to the third modified example will be specifically explained with reference to a flowchart in FIG. 6.

Figure 6:
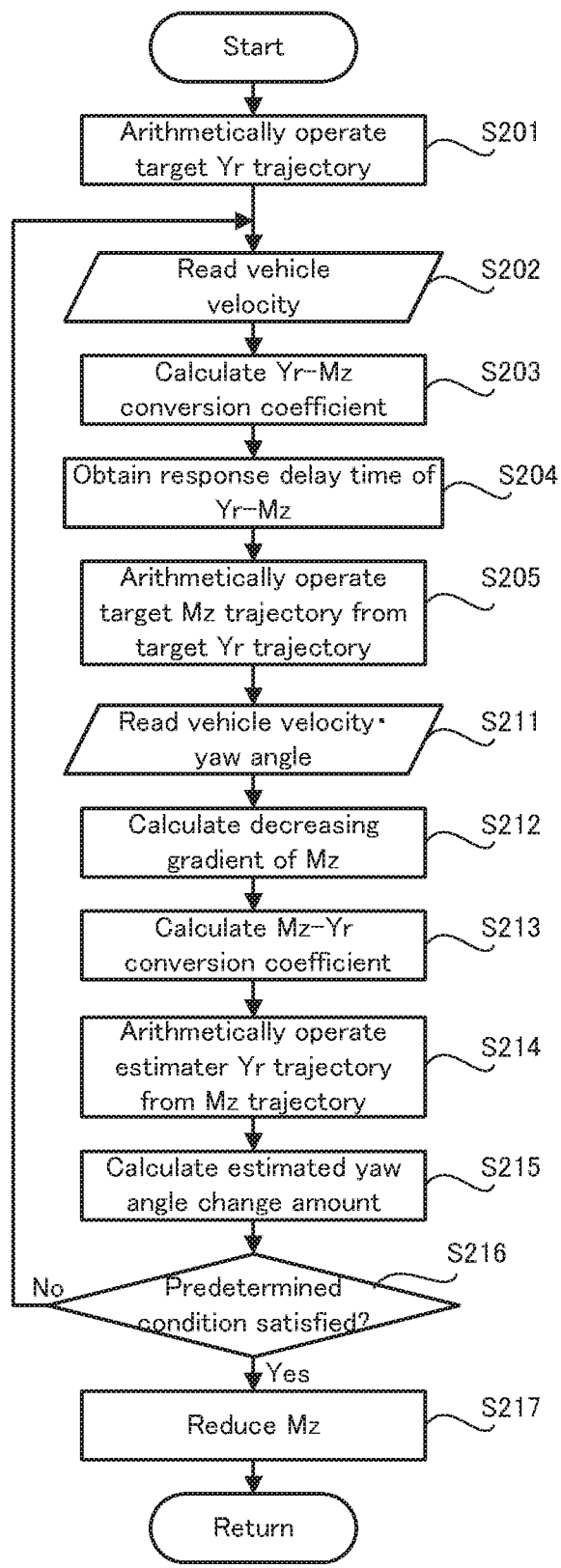
FIG. 6 is a flowchart illustrating a departure avoidance control performed by an LDA controller according to a third modified example of the first embodiment.
Figure 7A:
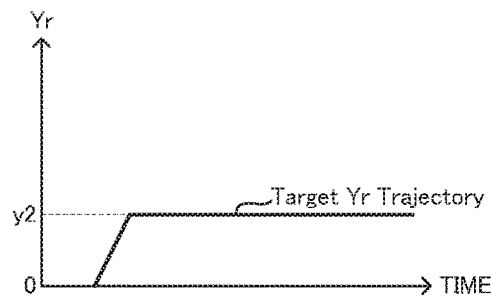
FIG. 7A and FIG. 7B are diagrams illustrating one example of the target yaw rate trajectory, the target yaw moment trajectory, and an estimated yaw rate trajectory.

In FIG. 6, firstly, the LDA controller 172 arithmetically operates the target yaw rate trajectory (the step S201). FIG. 7A illustrates one example of the target yaw rate trajectory arithmetically operated in the step S201. As illustrated in FIG. 7A, in this modified example, the target yaw rate trajectory without any falling part is arithmetically operated.

The LDA controller 172 performs a step S211 to a step S215 in parallel with the step S202 to the step S205. In the step S211, the LDA controller 172 obtains the velocity of the vehicle 1 and the yaw angle, for example, from the detection results of the vehicle velocity sensor 151 and the yaw rate sensor 153.

The LDA controller 172 then calculates a decreasing gradient of the target yaw moment trajectory (i.e. a slope of the falling part) (step S212). Here, the LDA controller 172 may calculate the decreasing gradient that takes into account the behavior of the vehicle 1 when the yaw moment is reduced (e.g. that does not make an occupant of the vehicle 1 feel uncomfortable due to a change in deceleration), for example, on the basis of the current yaw moment of the vehicle 1.

In parallel with the step S212, the LDA controller 172 calculates a conversion coefficient "$A_3v$" on the basis of the velocity obtained in the step S211 (step S213). The LDA controller 172 then may arithmetically operate an estimated yaw rate trajectory by using the conversion coefficient "$A_3v$" (i.e. by multiplying the target yaw moment by the conversion coefficient "$A_3v$"), from the falling part of the target yaw moment trajectory. The LDA controller 172 further corrects the estimated yaw rate trajectory arithmetically operated, on the basis of the response delay time obtained in the step S204 (step S214).

Figure 7B:
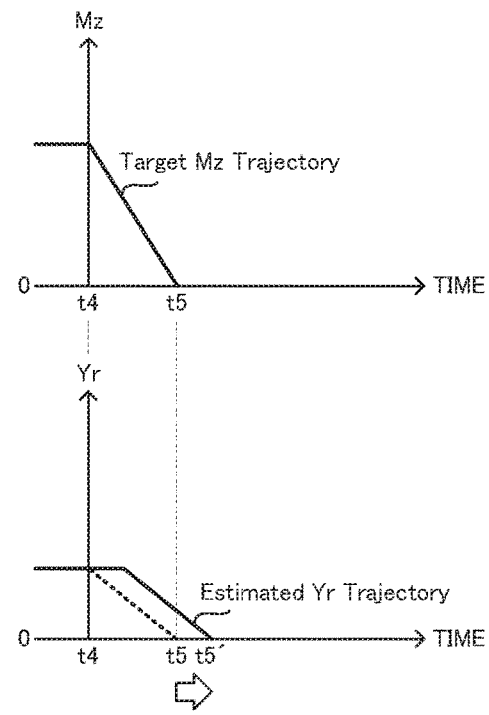

FIG. 7B illustrates one example of the target yaw moment trajectory arithmetically operated in the step S212, and one example of the estimated yaw rate trajectory arithmetically operated in the step S214. A dashed line in a lower part of FIG. 7B is a falling part of the estimated yaw rate trajectory obtained from the target yaw moment trajectory by using the conversion coefficient "$A_3v$". Due to the correction based on the response delay time, the estimated yaw rate trajectory becomes 0 at a time point t5', which is after a time point t5, as illustrated in a solid line in the lower part of FIG. 7B.

An area of a triangle that is surrounded by a part of the estimated yaw rate trajectory from a time point t4 to the time point t5', by a time axis, and by a yaw rate axis (hereinafter referred to as an "area of the falling part"), which are illustrated in FIG. 7B, corresponds to a change amount of the yaw angle of the vehicle 1 after a reduction in the target yaw moment is started (i.e. after the time point t4).

After the step S214, the LDA controller 172 calculates an estimated yaw rate change amount on the basis of the area of the falling part of the estimated yaw rate trajectory (step S215). The LDA controller 172 then determines whether or not a predetermined condition associated with the yaw angle is satisfied (step S216). Here, the predetermined condition is that "a sum of the current yaw angle of the vehicle 1 and the estimated yaw angle change amount calculated in the step S215 is greater than or equal to a target yaw angle when the departure avoidance control is ended (i.e. the angle made by the longitudinal direction axis of the vehicle 1 when the departure avoidance control is ended and the white line indicating the driving lane)".

In the determination in the step S216, if it is determined that the predetermined condition is not satisfied (the step S216: No), the LDA controller 172 repeats the process after the step S202. On the other hand, in the determination in the step S216, if it is determined that the predetermined condition is satisfied (the step S216: Yes), the LDA controller 172 transmits, to the brake controller 173, the signal indicating the target yaw moment so that the yaw moment is reduced in accordance with the decreasing gradient calculated in the step S212 (step S217).

(Technical Effect)

According to the departure avoidance control according to this modified example, it is possible to set the angle made by the longitudinal direction axis of the vehicle 1 when the departure avoidance control is ended and the white line indicating the driving lane, at a predetermined angle.

<Fourth Modified Example>

After the target yaw rate trajectory is arithmetically operated in the step S201, it may be determined which of the departure avoidance control according to the first embodiment and a track following control performed by the existing state feedback control is used to avoid the departure from the driving lane of the vehicle 1.

Figure 8:
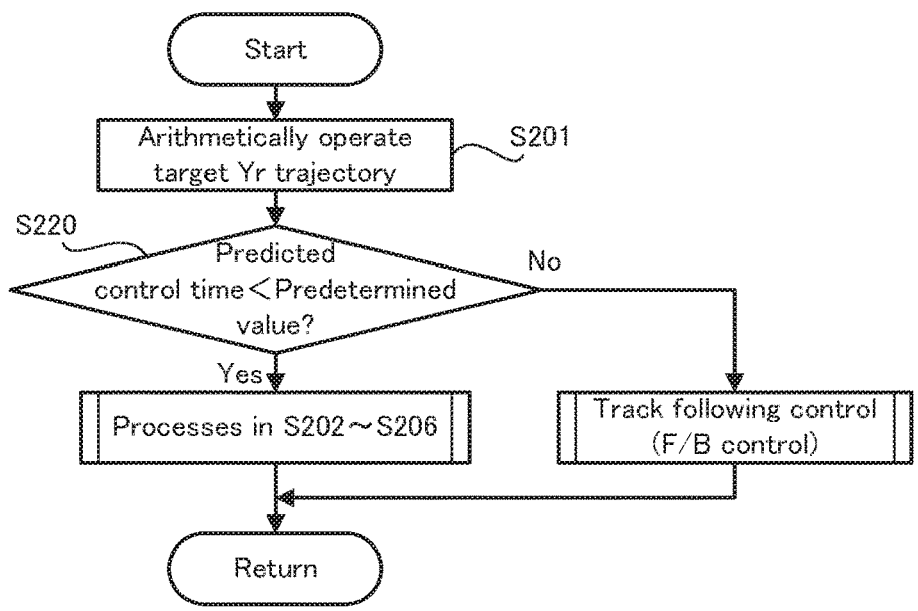
FIG. 8 is a flowchart illustrating a departure avoidance control performed by an LDA controller according to a fourth modified example of the first embodiment.

Specifically, in a flowchart in FIG. 8, after the step S201, the LDA controller 172 determines whether or not a predicted control time is less than a predetermined value (step S220). Here, the "predicted control time" may be set to a time from the rise to the fall of the target yaw rate trajectory. The "predetermined value" may be set, for example, to a lower value of the control time at which the departure from the driving lane of the vehicle 1 can be appropriately avoided due to the track following control, or the like.

In the determination in the step S220, if it is determined that the predicted control time is less than the predetermined value (the step S220: Yes), the LDA controller 172 performs the process after the step S202. On the other hand, in the determination in the step S220, if it is determined that the predicted control time is greater than or equal to the predetermined value (the step S220: No), the LDA controller 172 performs the track following control.

By virtue of such a configuration, it is possible to switch between the departure avoidance control and the track following control in accordance with the predicted control time. In other words, the departure avoidance control and the track following control can coexist.

<Second Embodiment>

Figure 9:
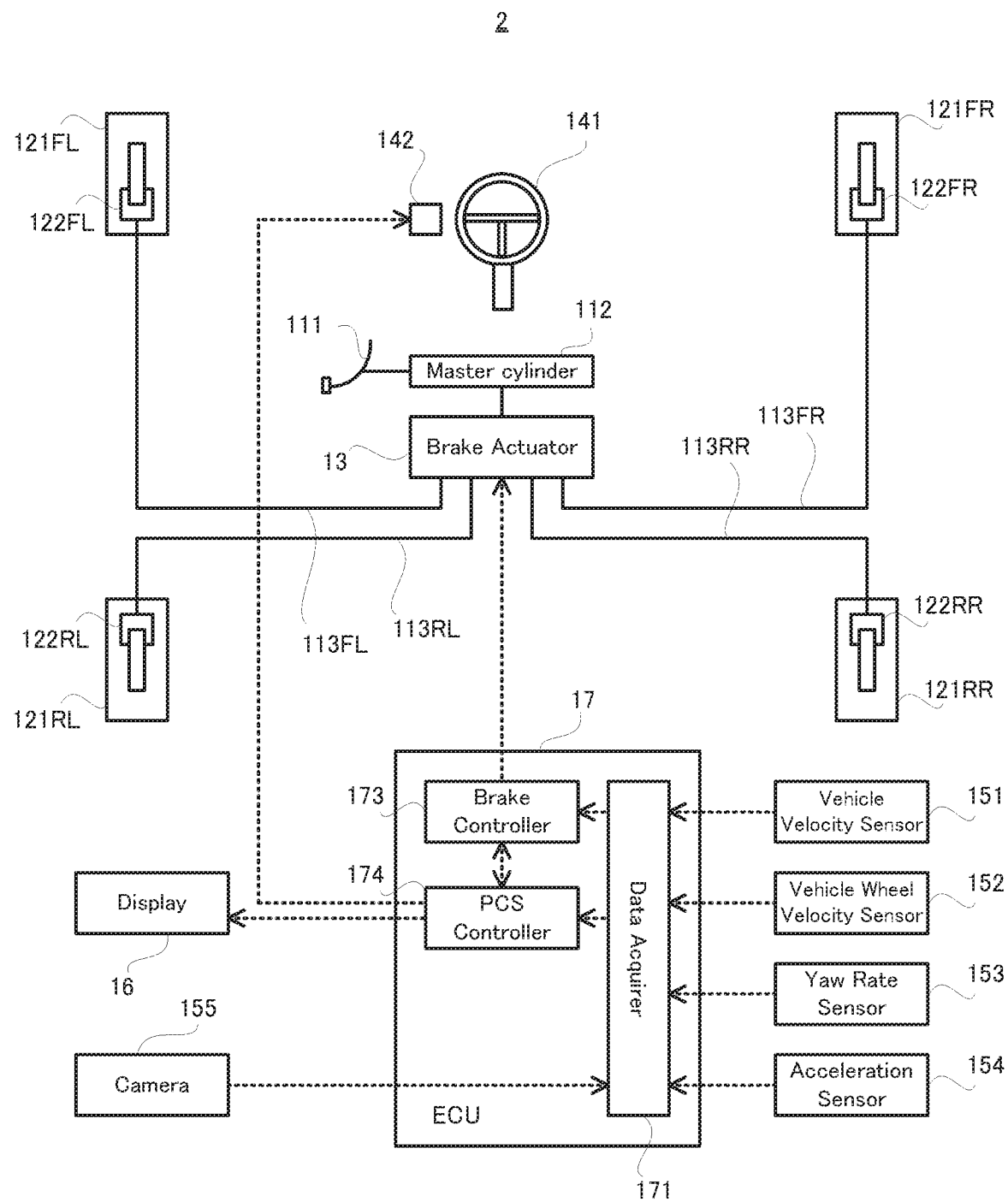
FIG. 9 is a block diagram illustrating a configuration of a vehicle according to a second embodiment.

A deflection control apparatus in a second embodiment of the present invention will be explained with reference to FIG. 9 to FIG. 11. The second embodiment is the same as the first embodiment, except that the deflection control apparatus is applied to a collision avoidance operation. Thus, in the second embodiment, the same explanation as in the first embodiment will be omitted, and the same parts on the drawings will carry the same reference numerals. Basically, a different point will be explained with reference to FIG. 9 to FIG. 11.

(Configuration of Vehicle)

A configuration of a vehicle 2 equipped with the deflection control apparatus according to the second embodiment will be explained with reference to FIG. 9. FIG. 9 is a block diagram illustrating the configuration of the vehicle 2 according to the second embodiment.

In the second embodiment, the ECU 17, which is one specific example of the "deflection control apparatus", is configured to detect another vehicle and a pedestrian or the like that exist on a course of the vehicle 2 and to perform the collision avoidance operation if there is a high possibility of collision. In order to perform the collision avoidance operation, the ECU 17 is provided with a pre-crash safety (PCS) controller 174, as a processing block logically realized or a processing circuit physically realized inside the ECU 17.

(Collision Avoidance Operation)

Next, the collision avoidance operation according to the second embodiment will be explained with reference to a flowchart in FIG. 10.

Figure 10:
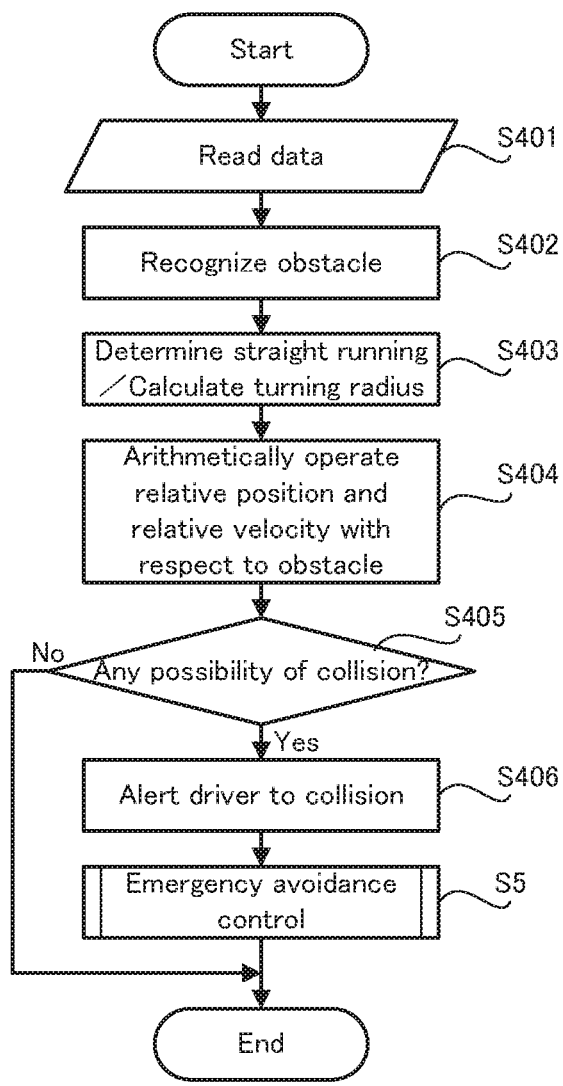
FIG. 10 is a flowchart illustrating a collision avoidance operation performed by an LDA controller according to the second embodiment.

In FIG. 10, firstly, the data acquirer 171 obtains detection data indicating respective detection results of the vehicle velocity sensor 151, the vehicle wheel velocity sensor 152, the yaw rate sensor 153, and the acceleration sensor 154, and image data indicating images taken by the camera 155 (step S401).

The PCS controller 174 analyzes the image data obtained in the step S401, thereby recognizing an obstacle that exists on the course of the vehicle 2 (step S402). The PCS controller 174 may recognize the obstacle, for example, from a detection result of a millimeter wave radar (not illustrated) or the like, in addition to the images taken by the camera 155. A detailed explanation of a method of recognizing the obstacle will be omitted because the existing technique/technology can be applied to the method.

In parallel with the step S402, the PCS controller 174 analyzes the image data obtained in the step S401, thereby specifying a lane edge of a driving lane on which the vehicle 2 is currently traveling (or a "white line" exemplified in the second embodiment as one example of the lane edge) in the images taken by the camera 155. The PCS controller 174 then determines whether or not the driving lane on which the vehicle 2 is currently traveling is a straight lane or a curve, on the basis of the specified white line, and calculates a curvature radius of the driving lane if the driving lane is determined to be the curve (step S403).

The PCS controller 174 arithmetically operates a relative position and a relative velocity of the obstacle recognized in the step S402 with respect to the vehicle 2, on the basis of the detection data obtained in the step S401 or the like (step S404).

The PCS controller 174 then determines whether or not there is a possibility that the vehicle 2 collides with the obstacle (step S405). Specifically, for example, the PCS controller 174 may calculate a future position (e.g. in several to several ten seconds) of the vehicle 2, on the basis of a current velocity, a current lateral position, current longitudinal acceleration, and current lateral acceleration of the vehicle 2, and the relative position and the relative velocity of the obstacle, or the like. Then, the PCS controller 174 may determine whether or not the future position of the vehicle 2 overlaps a future position of the obstacle. If it is determined that the future position of the vehicle 2 overlaps the future position of the obstacle, the PCS controller 174 determines that there is the possibility that the vehicle 2 collides with the obstacle.

In the determination in the step S405, if it is determined that there is no possibility that the vehicle 2 collides with the obstacle (the step S405: No), the collision avoidance operation illustrated in FIG. 10 is ended. Then, the PCS controller 174 restarts the collision avoidance operation illustrated in FIG. 10 after a lapse of a second predetermined period (e.g. several milliseconds to several ten milliseconds). In other words, the collision avoidance operation illustrated in FIG. 10 is repeated with a period corresponding to the second predetermined period.

On the other hand, in the determination in the step S405, if it is determined that there is the possibility that the vehicle 2 collides with the obstacle (the step S405: Yes), the PCS controller 174 alerts a driver of the vehicle 2 to the possibility of the collision of the vehicle 2 with the obstacle (step S406). Specifically, the PCS controller 174 may control the display 16, for example, to display an image for calling the driver's attention, such as, for example, "Brake!", and/or may sound an alarm buzzer (not illustrated).

In parallel with the step S406, the PCS controller 174 performs an emergency avoidance control (step S5). Here, the emergency avoidance control is a control in which a yaw moment in a direction of avoiding the collision is applied to the vehicle 2 so that the collision between the vehicle 2 and the obstacle is avoided.

In the emergency avoidance control in the second embodiment, the braking force is applied to at least one of the front left wheel 121FL, the rear left wheel 121RL, the front right wheel 121FR, and the rear right wheel 121RR so that there is the braking force difference between the left and right wheels. As a result, the yaw moment in the direction of avoiding the collision is applied to the vehicle 2. Hereinafter, the emergency avoidance control will be specifically explained with reference to a flowchart in FIG. 11.

Emergency Avoidance Control (PCS Controller)

Figure 11:
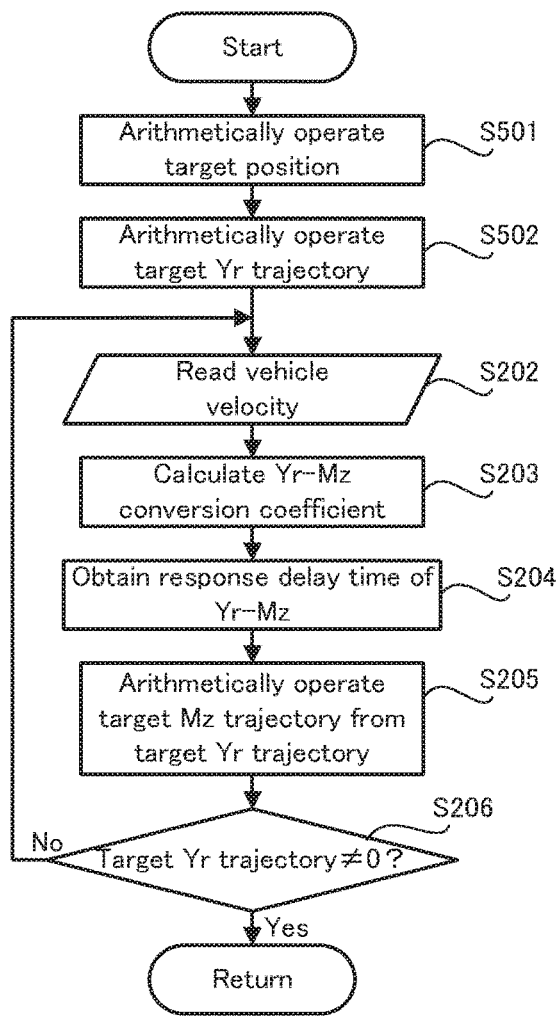
FIG. 11 is a flowchart illustrating an emergency avoidance control performed by a PCS controller according to the second embodiment.
Figure 12A:
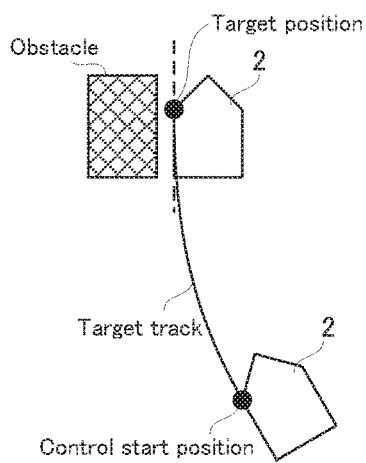
FIG. 12A and FIG. 12B are diagrams illustrating one example of a target track in the emergency avoidance control according to the second embodiment.
Figure 12B:
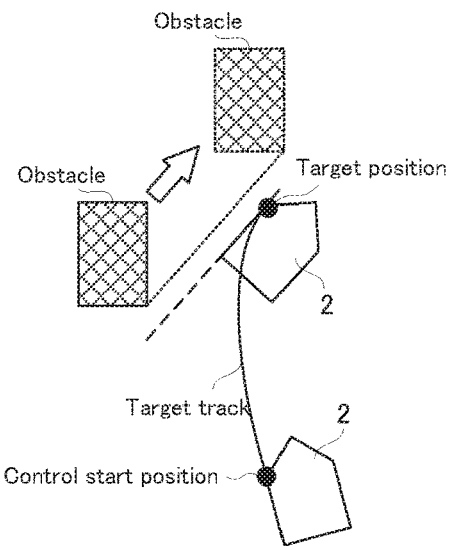

In FIG. 11, firstly, the PCS controller 174 arithmetically operates a target position (step S501). Here, the target position is, for example, a position that is a predetermined distance away from a side surface of the obstacle (or a position on a dashed line in FIG. 12A), as illustrated in FIG. 12A. If the obstacle moves, the target position may be a position that is a predetermined distance away from an outer edge of a movement range of the obstacle, as illustrated in FIG. 12B. The predetermined distance may be a distance that allows the vehicle 2 to safely pass by the obstacle.

The PCS controller 174 then arithmetically operates a target yaw rate trajectory so that the vehicle 2 drives along a target track on which the vehicle 2 passes by the target position (i.e. the vehicle 2 avoids the obstacle) (step S502). Specifically, the PCS controller 174 may use the following calculation conditions as a premise, and may arithmetically operate the target yaw rate trajectory, for example, on the basis of an angle made by a virtual line (or a dashed line in FIG. 12A and FIG. 12B), which is a predetermined distance away from the side surface of the obstacle and which extends along the side surface, and a longitudinal direction axis of the vehicle 2, and a velocity of vehicle 2, or the like. The calculation conditions may be (i) that the target yaw rate trajectory is a trapezoidal wave, (ii) that the trapezoidal wave has a constant rise time (e.g. 0.5 seconds), (iii) that the vehicle 2 has a maximum moving distance in a direction crossing an extending direction of the virtual line when an angle made by the virtual line and the vehicle 2 is 0 degrees.

The PCS controller 174 then performs the same process as in the step S202 to the step S206 in the flowchart in FIG. 3. In other words, the PCS controller 174 obtains the velocity of the vehicle 2, for example, from the detection result of the vehicle velocity sensor 151 (the step S202). The PCS controller 174 then calculates the conversion coefficient "$A_3v$" for converting the yaw rate into the yaw moment, on the basis of the velocity of the vehicle 2 (the step S203).

In parallel with the step S203, the PCS controller 174 obtains the response delay time until the yaw rate corresponding to the yaw moment applied to the vehicle 2 is generated after the application of the yaw moment to the vehicle 2 (the step S204).

The PCS controller 174 then arithmetically operates the target yaw moment trajectory from the target yaw rate trajectory by using the conversion coefficient "$A_3v$", and corrects the target yaw moment trajectory on the basis of the response delay time (the step S205). The PCS controller 174 may actually obtain the corrected target yaw moment trajectory for the short period $\Delta t$, and may calculate the braking force that allows the target yaw moment for the short period $\Delta t$ to be applied to the vehicle 2. The PCS controller 174 then may transmit, to the brake controller 173, the signal indicating the calculated braking force.

The PCS controller 174 then determines whether or not the target yaw rate trajectory for the short period $\Delta t$ is not 0 (the step S206). In the determination, if it is determined that the target yaw rate trajectory for the short period $\Delta t$ is not 0 (the step S206: No), the PCS controller 174 repeats the process after the step S202. On the other hand, in the determination, if it is determined that the target yaw rate trajectory for the short period $\Delta t$ is 0 (the step S206: Yes), the PCS controller 174 ends the emergency avoidance control illustrated in FIG. 11.

Emergency Avoidance Control (Brake controller)

The brake controller 173 performs the same process as those in the step S301 to the step S302 in the flowchart in FIG. 4. In other words, the brake controller 173 calculates the pressure command value for designating the pressure of the brake fluid required to generate the braking force, on condition that the signal indicating the braking force is received from the PCS controller 174 (the step S301).

The brake controller 173 then controls the brake actuator 13 on the basis of the pressure command value (the step S302). As a result, the braking force corresponding to the pressure command value is applied to at least one of the front left wheel 121FL, the rear left wheel 121RL, the front right wheel 121FR, and the rear right wheel 121RR. In other words, the yaw moment in the direction of avoiding the collision is applied to the vehicle 2 due to the braking force difference between the left and right wheels.

(Technical Effect)

According to the emergency avoidance control, it is possible to make the vehicle 2 travel along the target track while suppressing a time in which the yaw rate in the direction of avoiding the collision is applied to the vehicle 2 due to the braking force difference between the left and right wheels.

The "PCS controller 174" according to the second embodiment is another example of the "calculator" according to embodiments of the present invention.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A deflection control apparatus configured to perform a deflection control in which a subject vehicle, the subject vehicle including a braking apparatus configured to apply a braking force to each wheel, and a velocity sensor, is deflected by a braking force difference between left and right wheels of the subject vehicle that is generated by the braking apparatus, said deflection control apparatus comprising:
an electronic control unit (ECU) including at least one processing circuit, configured to:
(i) calculate a target yaw rate so that the subject vehicle drives on a target track by the deflection control, (ii) obtain a velocity of the subject vehicle detected by the velocity sensor, and (iii) calculate a target yaw moment by dividing the calculated target yaw rate by a coefficient based on the velocity of the subject vehicle; and
control the braking apparatus to apply a braking force to the each wheel so as to generate the braking force difference between the left and right wheels that applies a yaw moment corresponding to the target yaw moment.

2. The deflection control apparatus according to claim 1, wherein said ECU is configured to calculate the target yaw moment by correcting a provisional value of the target yaw moment, which is obtained by dividing the calculated target yaw rate by the coefficient, on the basis of a response time until a yaw rate corresponding to the target yaw moment is actually generated in the subject vehicle in the deflection control.

3. The deflection control apparatus according to claim 2, wherein said ECU is further configured to:
repeat calculation of the target yaw moment during implementation of the deflection control, and
calculate the target yaw moment while successively updating the coefficient on the basis of a current velocity of the subject vehicle detected by the velocity sensor.

4. The deflection control apparatus according to claim 2, wherein the target track is a track on which departure can be avoided if there is a possibility that the subject vehicle departs from a driving lane on which the subject vehicle is currently traveling.

5. The deflection control apparatus according to claim 1, wherein the ECU is further configured to:
repeat calculation of the target yaw moment during implementation of the deflection control, and
calculate the target yaw moment while successively updating the coefficient on the basis of a current velocity of the subject vehicle detected by the velocity sensor.

6. The deflection control apparatus according to claim 5, wherein the target track is a track on which departure can be avoided if there is a possibility that the subject vehicle departs from a driving lane on which the subject vehicle is currently traveling.

7. The deflection control apparatus according to claim 1, wherein the target track is a track on which departure can be avoided if there is a possibility that the subject vehicle departs from a driving lane on which the subject vehicle is currently traveling.

* * * * *